United States Patent [19]

Kiesel et al.

[11] Patent Number: 4,649,568

[45] Date of Patent: Mar. 10, 1987

[54] RECONSTITUTION OF IMAGES

[75] Inventors: Kenneth C. Kiesel, Wayland; William R. Wray, Winchester, both of Mass.

[73] Assignee: Polaroid Corporation, Cambridge, Mass.

[21] Appl. No.: 663,719

[22] Filed: Oct. 22, 1984

[51] Int. Cl.[4] .............................................. G06K 9/36
[52] U.S. Cl. ..................................................... 382/41
[58] Field of Search ............................ 382/41, 47, 44; 358/137, 140

[56] References Cited

U.S. PATENT DOCUMENTS

| | | | |
|---|---|---|---|
| 3,553,360 | 1/1971 | Land et al. | 358/21 |
| 3,651,252 | 3/1972 | Land et al. | 178/6 |
| 3,887,939 | 6/1975 | Hunt | 358/75 |
| 4,148,070 | 4/1979 | Taylor | 358/140 |
| 4,163,257 | 7/1979 | White | 358/133 |
| 4,174,514 | 11/1979 | Sternberg | 340/146.3 |
| 4,215,414 | 7/1980 | Huelsman | 364/515 |
| 4,229,797 | 10/1980 | Ledley | 364/515 |
| 4,346,409 | 8/1982 | Ishida et al. | 358/280 |
| 4,353,092 | 10/1982 | Bailey | 358/160 |
| 4,386,366 | 5/1983 | Mori | 358/135 |
| 4,442,545 | 4/1984 | Reitmeier et al. | 382/44 |
| 4,446,484 | 5/1984 | Powell | 358/166 |
| 4,558,347 | 12/1985 | Pritchard et al. | 358/140 |

FOREIGN PATENT DOCUMENTS 2108689  5/1983  United Kingdom .

OTHER PUBLICATIONS

Chow, C. K., and T. Kaneko: *Boundary Detection of Radiographic Images by a Threshold Method*, Information Proc. 71, 23–28, Aug. '71, pp. 1530–1535.

Rajala, S., & R. Figueiredo: *Adaptive Nonlinear Image Restoration by a Modified Kalman Filtering Approach*, ICASSP 80 Proceedings—IEEE Int. Conference on Acoustics, Speech & Sig. Proc., vol. 2, pp. 414–417.

Berstein, R.: *Digital Image Processing of Earth Observation Sensor Data* IBM Journal Resource and Dev., vol. 2, No. 1, 1/76, pp. 40–57.

*Primary Examiner*—Anthony V. Ciarlante
*Attorney, Agent, or Firm*—Lahive & Cockfield

[57] ABSTRACT

Improvements in a full resolution image A are effected with an economical use of computer processing equipment and time by determining a field of improvement functions derived from processing a coarse representation of the original full resolution image. The coarse representation B is subjected to lightness field analysis to obtain an improved coarse image C, from which a coarse improvement field D is extracted by subtracting the original coarse representation. To obtain a full resolution improvement field E, the coarse improvement function is smoothly expanded by interpolation to the dimensions of the full resolution image. By modifying the original full resolution image field A with the values of the full resolution improvement field E, an improved full resolution image is obtained.

10 Claims, 7 Drawing Figures

RECONSTITUTION OF IMAGES

BACKGROUND OF THE INVENTION

1. Field of the Invention

This invention relates generally to image processing apparatus and methods and, more particularly, to image processing apparatus and methods for analyzing images and reconstituting them as improved images.

2. Description of the Prior Art

Image processing apparatus have been proposed for sensing the individual radiance values of each picture element or pixel in a scene to obtain a radiance field, which is then processed to obtain an output field with various beneficial effects of image processing. Some such processes are described in U.S. Pat. No. 3,553,360, of Land and McCann, entitled "Method and System for Image Reproduction Based on Significant Visual Boundaries of Original Subject", issued Jan. 5, 1971; U.S. Pat. No 3,651,252, of Land, Ferrari, Kagan, and McCann, entitled "Image Reproduction System Which Detects Subject by Sensing Intensity Ratios", issued Mar. 21, 1972; and U.S. Pat. No. 4,384,336 of Frankle and McCann issued May 17, 1983.

These prior art arrangements involve sensing the individual radiance values of the different areas of a scene and then performing a plurality of operations for each such area in which its radiance value is compared to that of other scene areas to derive a revised value for each area from which an improved image of the scene is produced.

One object of this invention is to provide improved apparatus and methods for processing information representative of an image-wise distribution of radiation from a subject, and producing an improved image therefrom.

Another primary object of this invention is to provide a method and apparatus for processing and reconstituting an improved image of a scene with a minimum number of process steps capable of being handled by relatively simplified processing equipment.

A still further purpose of the invention is to provide a method and apparatus for analyzing an image and reconstituting it as an improved final image by techniques which simplify the processing steps and reduce the demands on computer memories and associated equipment.

DESCRIPTION OF THE DRAWINGS

The invention, both to its organization and its methods of operation, is represented in the embodiments described in the following detailed description in connection with the accompanying drawings wherein.

SUMMARY OF THE INVENTION

In the practice of this invention a relatively coarse image representation is processed by a comparatively small computational system to derive a coarse-field improvement function. This coarse field function is then expanded and smoothed by interpolation to provide a comparatively fine-field improvement function which is applied pixel-by-pixel to a full resolution radiance field to obtain a final improved image representation. Obtaining the improvement function by processing of a coarse image field dramatically reduces the complexity of the computational process, minimizes the cost of the computational equipment and shortens the time required to produce a final image.

DESCRIPTION OF THE PREFERRED EMBODIMENTS

Figure 1:
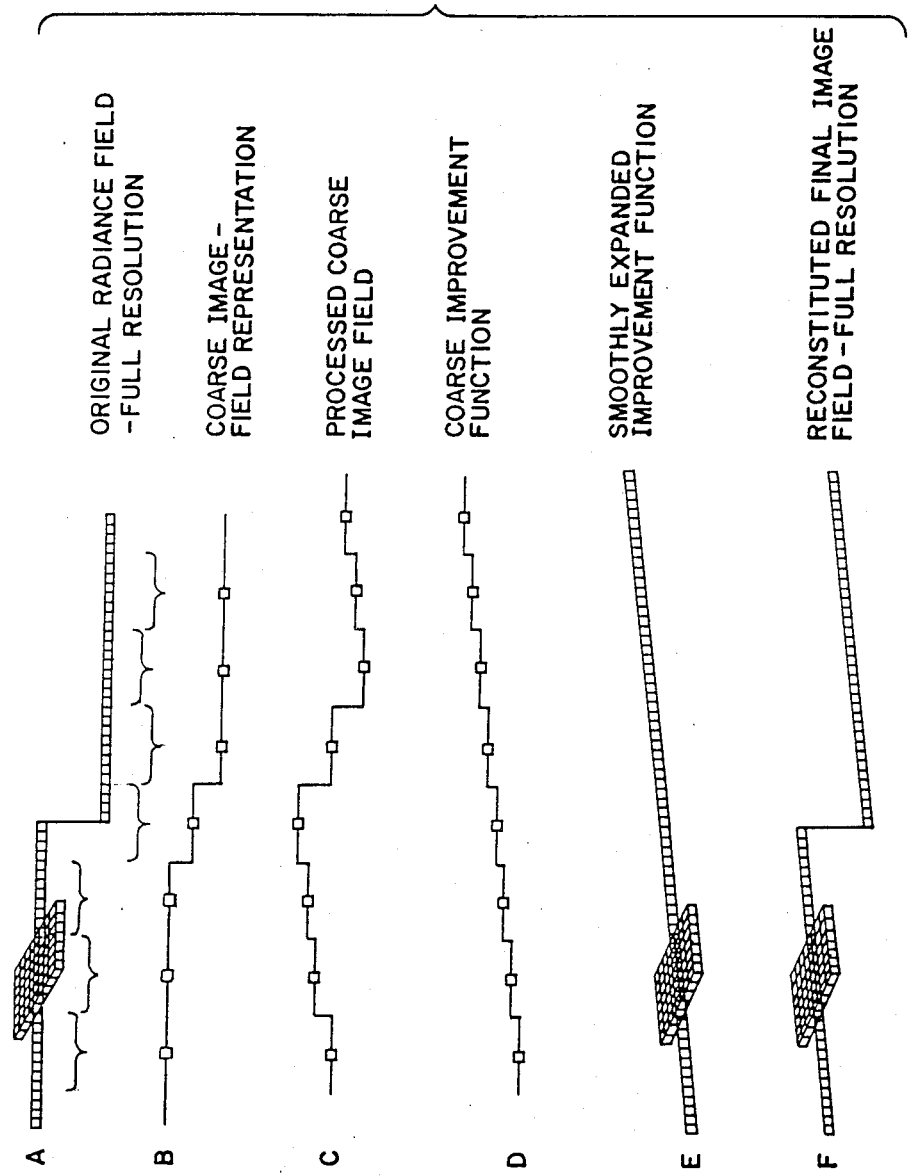
FIG. 1 represents in simplified form a method by which the individual radiance values associated with discrete pixels of an original image are analyzed and reconstituted to derive an improved final image.

The charts in FIG. 1 illustrate in a simplified form the methods employed in a currently preferred embodiment of the invention for the analysis and reconstitution of an image. Chart A represents a small portion of an original image defined in terms of the distribution of radiation. Consider, as a hypothetical example, that an imagewise distribution of radiation is incident upon a finely-divided sensory array of $512 \times 512$ pixels, which define the full image resolution in this example. The radiation-sensitive elements of this array produce a radiance field, i.e., a combination of outputs or data points. Chart A represents a small strip of this radiance field containing a transition or distinct radiance boundary between adjacent portions of the image having different brightnesses. Next, the outputs of the finely divided array are averaged down to a coarsely divided array, which may be on the order of $64 \times 64$ pixels, representing significantly fewer image elements than are contained in the original radiance field. In this example, each $8 \times 8$ pixel group from Chart A has been averaged down to a single pixel in Chart B. It can be seen in Chart B that the sharpness of the image boundary in Chart A has been degraded in the process of developing the coarse image field represented in part by Chart B. What has been gained, however, is a simpler image-representing field which may be analyzed for determining the nature of an improvement function to be applied to the full-resolution image.

The next step in this hypothetical example is to process the coarse image according to a desired program. One type of processing which may be applied is lightness field processing such as is described in the aforesaid copending U.S. Pat. No. 4,384,336, or in the European Patent Application No. 81006677.8 based thereon, published Mar. 10, 1982. Another type of processing which might be employed at this stage on the coarse image representation could employ two-dimensional Fourier spectral filtering techniques. Other types of image-processing algorithms may also be used. Whatever form of processing is employed will produce a coarse processed image field, such as that represented in Chart C. This will have some characteristics differing from those of the unprocessed coarse image field of Chart B and it is precisely these characteristics which are sought to be obtained.

These characteristics are derived by simply subtracting the coarse image field representation of Chart B from the processed coarse image field of Chart C to obtain a coarse improvement field or function represented in Chart D. In this illustrative example, closely adjacent local image relationships have been removed from this coarse improvement field, and only longer-range interrelationships remain. Certain discontinuities still exist because of the coarseness of the field, but these are removed by expanding and smoothing, or interpolating the coarse improvement function from its 64×64 pixel configuration to the full 512×512 pixel dimensions of the original radiance field. By this process a full resolution improvement function represented by Chart E is obtained. The last step in this process is to modify each of the pixels in the full-resolution radiance field A by the corresponding pixel of the full resolution improvement function E to determine a reconstituted final image field in full resolution, as represented in Chart F.

Figure 2:
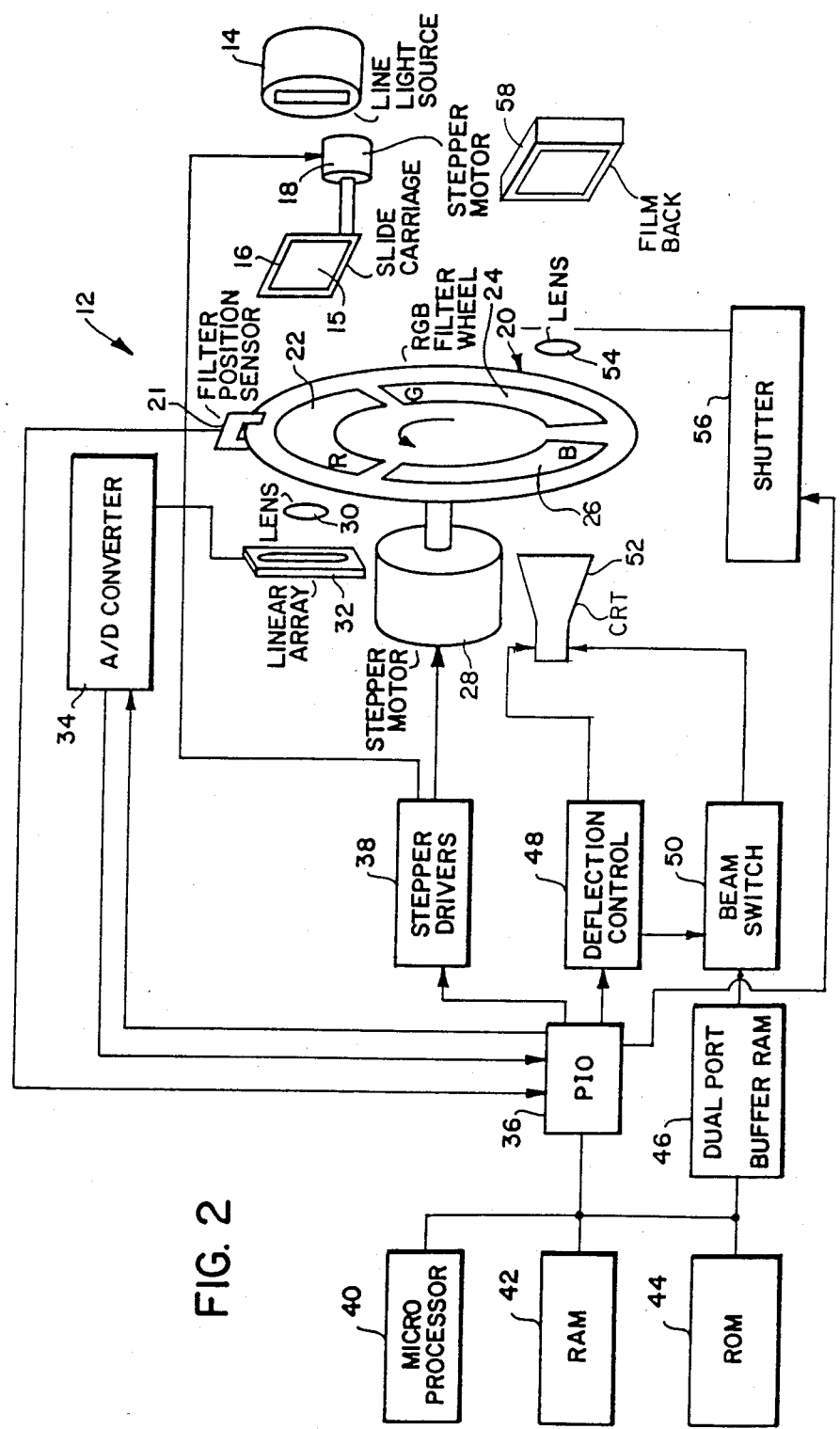
FIG. 2 is a block diagram showing one preferred form of image processing apparatus illustrating the principles of this invention.

Referring now to FIG. 2 there is shown the image processing apparatus for this invention comprising a line scanner as shown generally at 12. The line scanner 12 comprises a line light source 14 which emits a constant intensity line beam of light through an image transparency 15 held in position by a slide carriage 16 which can be incrementally moved across the line beam of light by a stepper motor 18. The line beam of light from source 14 after transmission through the image transparency 15 is directed to a filter wheel 20 comprising red, green and blue arcuate filters 22, 24 and 26 respectively disposed about the periphery of the filter wheel 20 in circumferentially spaced apart relationship with respect to each other. The filter wheel 20 may be incrementally rotated by a stepper motor 28 in a manner to be subsequently disclosed. The line beam of light from the source 14 after transmission through one of the red, green or blue filters of the filter wheel 20 is focused by a lens 30 so as to be incident to a linear photodetector array 32, for example comprising 512 photodetecting elements or diodes. The photodetector array 32 provides an analog output signal which is subsequently converted to a digital signal by an analog-to-digital converter 34 for transmission by way of a peripheral input-output device 36 to a random access memory (RAM) 42, preferably comprising at least a 32 k byte memory. A microprocessor 40 under the direction of a program read only memory (ROM) 44 controls the transmission and computation of data in the manner of this invention to be subsequently described by way of the peripheral input-output device 36 which, in turn, also controls stepper drivers 38 to drive the stepper motors 18 and 28.

Figure 3:
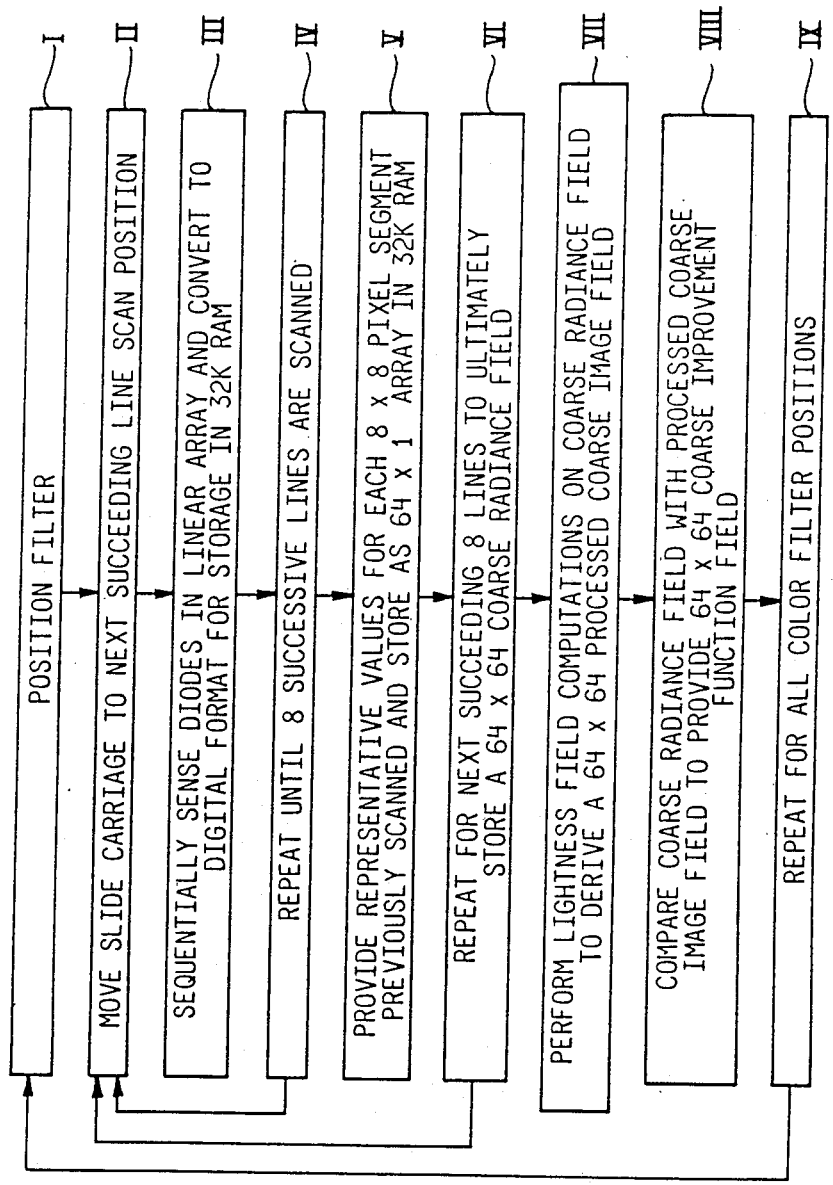
FIG. 3 is a flowchart showing a portion of the steps performed by the apparatus of FIG. 2.

An image of a scene to be processed and reconstructed in the manner of this invention is first recorded on the transparency 15 which is stationed in the slide carriage 16. The filter wheel 20 is moved to its initial position which for purposes of this illustration is the position in which the red filter 22 is aligned between the lens 30 and the line light source 14 as shown in the drawing. This first step of positioning filter wheel 20 is represented by block I in the flow-chart of FIG. 3. A filter position sensor 21 senses the position of the filter wheel 20 to assure that the appropriate filter color is aligned between the lens 30 and light source 14. The slide carriage 16 is next moved towards its initial line scanning position represented by block II in the flow-chart of FIG. 3 such that the line beam of light from the source 14 aligns adjacent to one vertical edge of the slide transparency 15. The photodetecting elements of the array 32 are sequentially read and analog output signals from each photodetector element are converted to a digital signal by the converter 34 and thereafter directed by the peripheral input-output device 36 for storage in the random access memory (RAM) 42.

The analog output signal value of each photodetecting element of the array 32 corresponds to an individual radiance value for the spatially corresponding picture element or pixel of the scene recorded on the image transparency 15. Each pixel comprises a discrete area of the scene recorded on the transparency 15. Thus the photodetective elements of the array 32 are sequentially sensed to detect analog radiance values for corresponding picture elements or pixels in the scene recorded by the slide transparency 15. The analog radiance values are thereafter converted to digital format for storage in the random access memory (RAM) 42 as represented by block III in the flowchart of FIG. 3. The radiance value for each pixel in the scene recorded on the slide transparency 15 is directly proportional to the transmissivity of each spatially corresponding pixel on the slide transparency 15.

The microprocessor 40 thereafter provides a control signal by way of the peripheral input-output device 36 to the stepper driver 38 to drive the stepper motor 18 to its next succeeding line scan position. The photodetector elements on the array 32 are again sequentially sensed to provide analog radiance values for each pixel on that line of the image scanned. The analog radiance values are subsequently converted to digital format for storage in the random access memory (RAM) 42. The process is repeated until 8 successive lines are scanned in this manner as represented by block IV in the flowchart of FIG. 3. Thus the radiance values are stored in digital format in 8-pixel strips of 512 pixels each.

Figure 5:
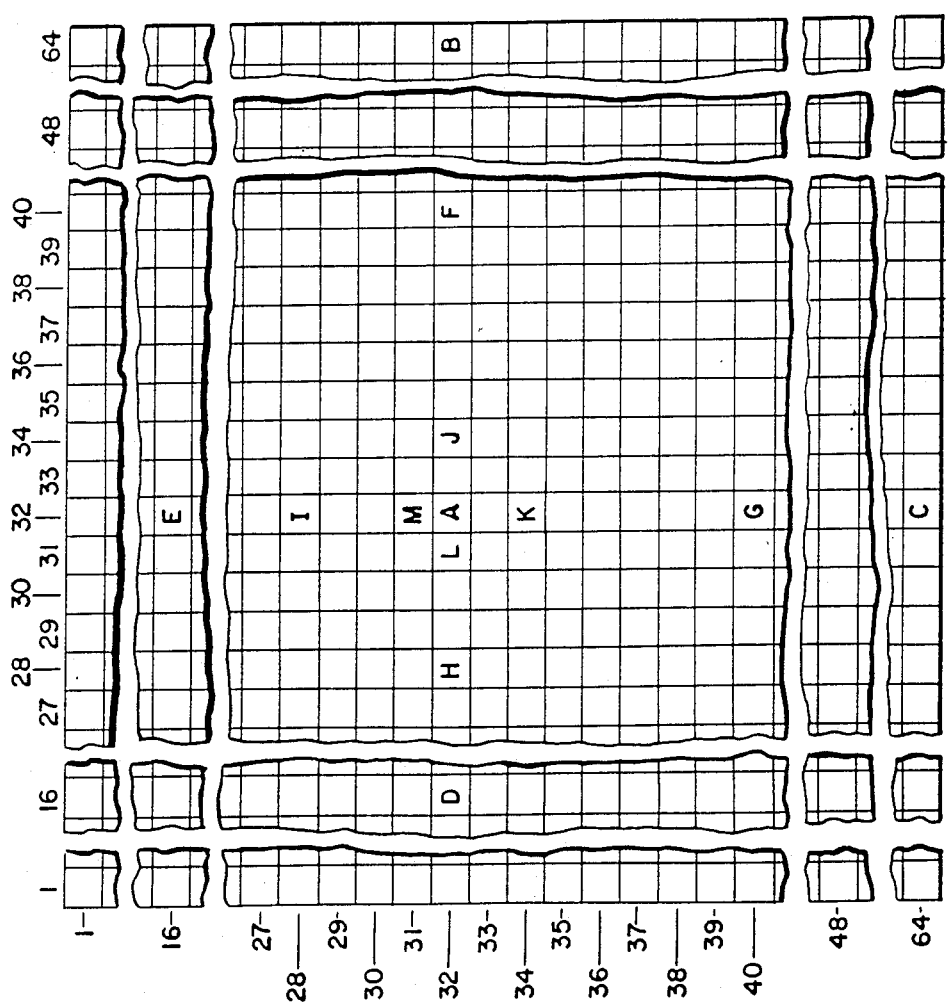
FIG. 5 is a fragmented view diagrammatically showing portions of a coarse image field to illustrate a method of image processing.

The radiance values for each 8×8 pixel group in the first 8 pixel strips are processed to provide radiance values for a relatively coarse 64×1 coarse pixel strip as shown by the first line in the coarse 64×64 radiance field in FIG. 5. The values assigned to each coarse pixel may represent either a weighted value, a mean value, a sampled value, or some other chosen coarse representation. The radiance values for the first 64×1 coarse pixel strip are stored in a different portion of the random access memory (RAM) 42 from that in which the initially detected radiance values for the first 8 full-resolution pixel strips are stored. The aforementioned coarse radiance values for each 8×8 pixel group provide representative radiance values for each coarse pixel in a 64×1 strip represented in block V of the flow-chart of FIG. 3. Radiance values for the pixels in the next succeeding 8 lines of the full resolution radiance field scanned by the line scanner 12 are thereafter stored in the random access memory (RAM) 42 in the aforementioned manner and subsequently processed to provide coarse radiance values for the next succeeding line in the coarse 64×64 radiance field shown in FIG. 5. The process is repeated for each of the succeeding 8 lines as shown by block VI of FIG. 3 until coarse values are provided in digital format for each coarse pixel in the coarse 64×64 radiance field shown in FIG. 5.

The relatively fine or full resolution 512×512 pixel radiance field is detected by the line scanner 12 in the aforementioned manner to obtain a radiance value for each pixel in the scene recorded on the slide transparency. Each radiance value is a measure of the light intensity from that pixel in the scene and is a function both of the illumination of the scene at that particular pixel and of the reflectance or transmittance of the scene at that particular pixel. Thus the finely divided 512×512 pixel radiance field is a measure of both the illumination characteristics of the scene as well as the reflectance or transmittance characteristics of the scene. The various reflectance characteristics of the scene are generally manifest by relatively discontinuous radiance changes at the visible boundaries in the scene while the illumination characteristics of the scene are generally manifest by both relatively discontinuous radiance changes, of which hard shadows are a prime example, as well as relatively continuous radiance gradients which gradually vary across portions of the scene. Thus when the slide transparency is projected to view the image of the scene recorded thereon, the image of the scene includes the same relatively continuous and discontinuous radiance changes.

The individual radiance values of the 512×512 pixel radiance field may be processed by methods such as those described in the aforesaid U.S. Pat. application Ser. No. 182,636 of Frankle and McCann to provide, for all pixels in the field, new resultant values which are responsive primarily to the relatively discontinuous radiance changes or transition values of the scene, thereby enabling an improved image of the scene to be made. Such computations, involving the individual radiance values for the 512×512 pixel radiance field involve a plurality of iterations in which comparisons are made between the individual radiance values of selected pixels. The method of this invention herein exemplified utilizes far fewer computations and requires less complex computer equipment, since the computations are performed only with respect to a relatively coarse image, such as a 64×64 pixel representation.

The next succeeding step (block VII, FIG. 3) which applies the beneficial process of this invention is performed on the coarse 64×64 image field to derive a corresponding 64×64 processed image field. A preferred form of processing performed on the coarse image field is described below in connection with FIG. 6. It is sufficient at this point to indicate that the process involves the comparison of coarse image pixels throughout the image field to develop a processed 64×64 coarse image field, the values of which are responsive not merely to localized values of radiance, but to interrelationships between pixels across the entire coarse image field.

This coarse 64×64 processed image provides an improved image for a coarse image of the scene. The coarse processed image obtained for the scene in this manner is then compared to the coarse 64×64 average radiance field to provide a coarse 64×64 improvement factor as shown in block VIII of FIG. 3. Thus, coarse 64×64 improvement factor is stored in the random access memory (RAM) 42 for subsequent retrieval during the construction of the final image field in the manner of this invention to be subsequently described. The aforementioned steps are repeated for each succeeding filter position of the filter wheel 22 so as to ultimately derive a processed coarse image field for each of the colors of the filter wheel 20.

An image of the scene recorded on the slide transparency 15 of FIG. 2 may be reconstructed on a section of light sensitive film utilizing the filter wheel 20, stepper motor 28, and stepper drivers 38, in conjunction with a cathode ray tube (CRT) 52 controlled by the deflection control 48 in conjunction with a beam switch 50. The light from the screen of the cathode ray tube 52 is directed through an appropriate one of the red, green and blue filters 22, 24 and 26 of the filter wheel 20, a lens 54, and a shutter 56 for exposing the photosensitive material stationed at a film plane 58.

Figure 4:
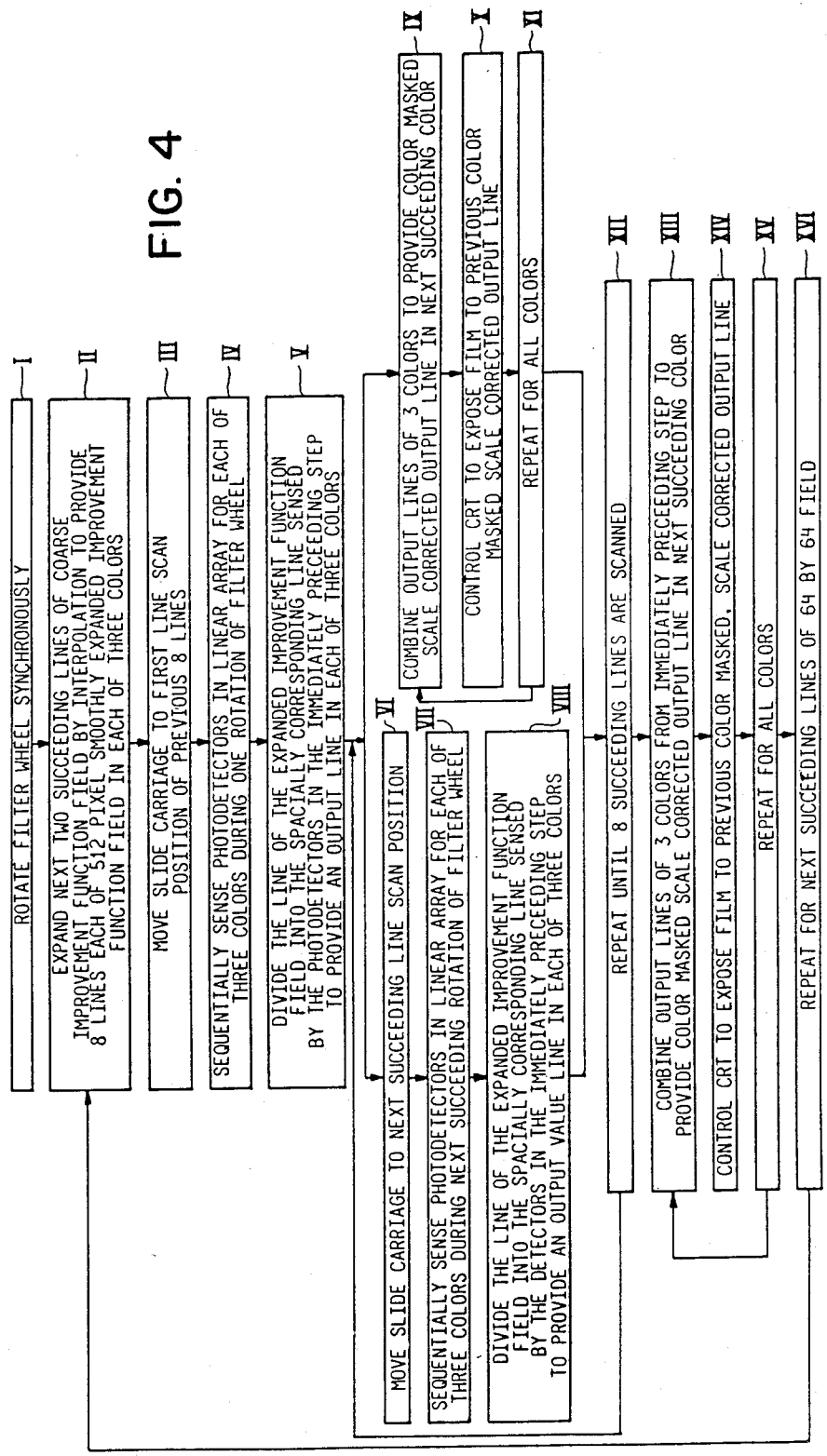
FIG. 4 is another flowchart showing another portion of the steps performed by the apparatus of FIG. 2.

Referring now to FIG. 4 in conjunction with FIG. 2 there is shown a flowchart by which the photosensitive material stationed at the film plane 58 may be exposed to provide an image of the scene photographed on the slide transparency 15 with the beneficial effects of image processing. As itemized in block I of FIG. 4, the filter wheel is synchronously rotated and the first two succeeding lines of the coarse 64×64 correction factor previously stored in the random access memory (RAM) 42 are expanded by any well-known method of interpolation such as straight line interpolation, or spline fit interpolation, or other expanding process to provide 8 lines each of 512 pixels of a full resolution expanded improvement factor in each of the primary red, blue and green colors as in block II of FIG. 4. In this manner, substantially abrupt changes in values across the coarse improvement factor image are smoothed. The expanded 8 lines of 512 pixels each of the expanded improvement factor image corresponds in location to the first 8 lines sensed by the full resolution photodetector array 32.

In the next step as shown in block III in the flowchart of FIG. 4, the slide carriage 16 is stepped by the stepper motor 18 to the first line scan position of the 8 lines expanded in the immediately preceding step. Each detector in the photodetector array 32 is then sensed, as in block IV of FIG. 4 to provide an analog radiance value which is subsequently converted to digital format by the A to D converter 34. The photodetector array 32 is sensed in each of the primary red, green and blue colors during one rotation of the filter wheel 20, and the first line of 512 pixels of the expanded improvement function gradient field from the preceding block II of the flowchart of FIG. 4 is used to modify the spatially corresponding line of 512 sensed radiance values by the photodetector array 32 in the immediately preceding step of block IV to provide a line of 512 final processed output values, as in block V of FIG. 4. In this example the elements of the full resolution image field are modified by dividing the value of each pixel by the value of the corresponding pixel of the expanded and smoothed improvement factor field. The output line of 512 final processed image field values provided in block V of the flowchart of FIG. 4 is repeated for each of the three primary red, green and blue colors. Thus during the first complete rotation of the filter wheel 20, the radiance values for the first line scanned in the slide transparency 15 are sensed and stored in the random access memory (RAM) 42 in all three primary colors and the spatially corresponding line of the expanded improvement factor values are divided into the stored line to yield a full resolution final output line.

During the next rotation of the filter wheel 20, the slide carriage 16 is moved up to the next succeeding line scan position as shown by block VI in the flowchart of FIG. 4. The photodetector array 32 is again sequentially sensed to provide a line of 512 analog radiance values which are subsequently converted by the analog-to-digital converter 34 to digital format for storage in the random access memory (RAM) 42 as indicated by block VII in the flowchart of FIG. 4. In the next step represented in block VIII of FIG. 4, the next corresponding line of 512 continuous energy gradient values from the expanded full resolution improvement function field are divided into the spatially corresponding radiance line of 512 radiance values sensed by the photodetector array 32 in the immediately preceding step of block VII to provide a line of 512 output values. Again, this step is accomplished for each of the three primary red, green and blue colors.

Simultaneous to the steps accomplished in blocks VI, VII, and VIII of the flowchart of FIG. 4, there is also provided a color masking-grey scale correction operation in which the full resolution processed output lines for the three primary colors determined in the previous step of block V are combined (block IX of FIG. 4) in a conventional manner to provide a color masked, scale corrected output line of 512 pixel output values in the first of the three primary red, green and blue colors, which for this example is red. The color-masked, scale-corrected final output line for the red primary color is written into the dual port buffer random access memory 46 and thereafter utilized to control the cathode ray tube 52 by way of the deflection control 48 and beam switch 50 to expose the photosensitive material at the film plane 58 in a conventional manner through the red filter portion 26 of the filter wheel 20. The electron beam of the cathode ray tube 52 is controlled by the deflection control 48 to scan a line which is focused by the lens 54 onto the photosensitive material at the film plane 58 (block X of FIG. 4), which line spatially corresponds to the line of the slide transparency scanned by the line scanner 12 in the steps shown by blocks III and IV of the flowchart of FIG. 4.

The above steps are repeated for the remaining two primary green and blue colors as shown in block XI of the flowchart of FIG. 4 so that the first line to which the photosensitive material is exposed comprises the three primary red, green and blue color components. The above steps are thereafter repeated as shown in block XII of the flow-chart of FIG. 4 until 8 succeeding lines across the the line scanner 12 are exposed to the photosensitive film on the film plane 58. The eighth line is exposed to the photosensitive material in the steps shown by blocks XIII, XIV, XV of FIG. 4 in the manner as previously indicated in relation to blocks IX, X, XI. The above-described steps are thereafter repeated for the next two succeeding lines of the coarse 64×64 improvement factor field as shown in block XVI of the flowchart of FIG. 4. Thus each successive group of 8 lines is scanned and exposed to the photosensitive material at the film plane 58 to reproduce an image of the scene with the beneficial effects of image processing.

Reproducing the image in the aforementioned manner by dividing the smoothly expanded improvement factor into the sensed full resolution radiance field is a mechanism for applying the beneficial effect of image processing in a highly efficient manner. In some applications it may be desirable, however, to apply only a selected proportion of the expanded improvement factor; and thus it may be preferable to apply a weighting factor. In either event, whether all or only a proportion of the expanded improvement factor is applied, the image reconstructed on the photo sensitive material at the film plane 58 is at the full resolution of the system.

Figure 6:
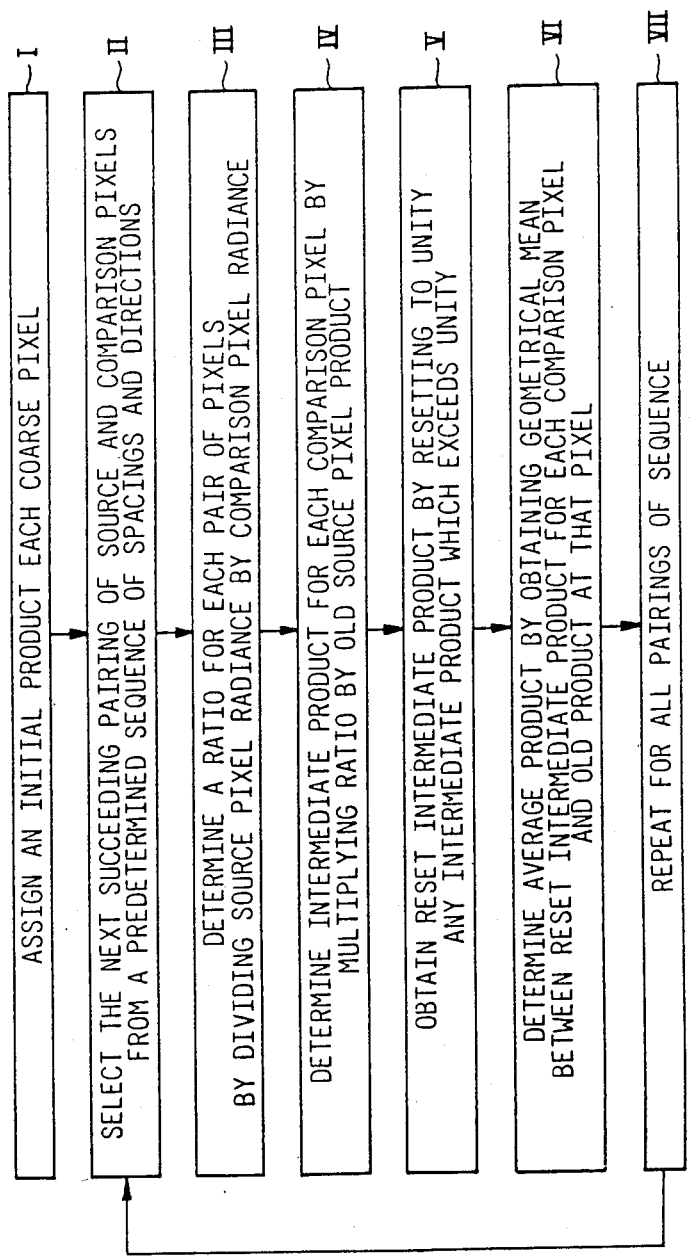
FIG. 6 is a flowchart showing still another portion of the steps performed by the apparatus of FIG. 2.

As discussed above in connection with FIG. 3 block VII, the coarse radiance field representative of the image-wise distribution of radiation from the original scene is, in accordance with this invention, subjected to processing to develop an improved coarse image which is then employed to develop a finely scaled improvement function field applicable to the full resolution image. The preferred method for processing the coarse field is by lightness field computations, such as those described in the aforesaid U.S. Pat. No. 4,384,336 of Frankle and McCann. In this process a series of iterations is performed on each pixel in the coarse radiance field to compare its radiance value with those of other coarse-field pixels thereby to assign to each pixel in the coarse field a new value. Each processing iteration in this illustrative example preferably involves a series of analytical steps, e.g. ratio, product, reset and average, upon the coarse 64×64 image field. Each item of information (i.e. pixel) in the coarse image field can be identified by labeling with the coordinates of that pixel. The system is initialized for the first iteration by assigning an old product to each pixel (FIG. 6 block I). The initializing product preferably corresponds to an extreme optical condition such as total blackness or full whiteness, but preferably with the latter, which corresponds to an initializing value of unity.

The next step of each iteration is relatively to pair the pixels of the coarse image field (FIG. 6 block II) and to compute for each pair the ratio of the radiance values at the paired pixels (FIG. 6 block III). The ratio is a measure which compares the radiance at one coarse field pixel, termed a source pixel, to the radiance at the paired coarse field pixel, termed a comparison pixel. When the radiance information is logarithmic, the log of this ratio can be calculated as the arithmetic difference between the logs of the paired radiance values. Thus where r(o,o) represents the radiance information at the source pixel and r(x,y) represents the radiance value at the comparison pixel, the ratio operation which the first step performs can be represented by the algebraic expression:

$$\log \frac{r(x, y)}{r(o, o)} = \log r(x, y) - \log r(o, o) \tag{1}$$

The next step in the processing iteration is to multiply this ratio by the old product previously assigned to or determined for the source pixel of each pair, to determine an intermediate product for the comparison pixel (FIG. 6 block IV). The multiplication can be performed by the addition of logarithms of the numbers. Hence, the algebraic expression for the log of the intermediate product at the comparison pixel is $$\log ip(x,y) = \log op(o,o) + \log r(x,y) - \log r(o,o) \tag{2}$$

where:
log ip(x,y) is the log of the intermediate product at the comparison pixel of the pair; and
log op(o,o) is the log of the old product previously existing, i.e. old product, at the source pixel.

In each processing iteration the intermediate products which are greater than unity, are then reset to unity (FIG. 6 block V). A star (*), designates a reset intermediate product in the following equations (3) and (4).

The next processing step combines reset intermediate products to form, for each comparison pixel, a new averaged product to be used in the succeeding iteration, (FIG. 6 block VI). It has been found preferable to produce the new averaged product as the geometric mean of the existing or old averaged product at the comparison pixel in each pairing and the new value of the reset intermediate product at that pixel, formed as set forth in equation (2). Where the term "log op(x,y)" is the logarithm of the old averaged product at the comparison pixel, the new product (np) at that location is thus calculated as $$\log np(x,y) = [\log op(x,y) + \log ip^*(x,y)]/2 \quad (3)$$

and is defined as $$\log np(x,y) = \tfrac{1}{2}([\log op(x,y)] + [\log op(o,o) + \log r(x,y) - \log r(o,o)) \quad (4)$$

This log of the new averaged product at the comparison location (x,y) is used as the log of the old averaged product term for that location in the next iteration.

The four computational steps described above are repeated (FIG. 6 block II) according to a specified sequence of different pairings of the coarse field pixels as illustrated in FIG. 5. In the first iteration: Each coarse field pixel is paired with the pixel 32 pixel units to the right, for example A and B. It will be understood that identical pairings are made for every other pixel and the pixel 32 units to its right. In the second iteration each coarse image field pixel is paired with the pixel 32 units below it, for example pixels A and C.

The process is repeated until, for example, coarse field pixel A is sequentially compared to the pixels B, C, D, E, F, G, H, I, J, K, L and M at which time the last final value for the pixel A is stored in the random access memory (RAM) 42. In this manner final values are determined for each coarse field pixel group by effectively providing a comparison of its value to the values of substantially all the other coarse field pixels without making a direct comparison of it to each of the other pixels. This ordered sequence of pairings is an example of only one preferred ordered sequence of pairings, and does not preclude other ordered sequences of pairings. In addition, whereas the ordered sequence of comparisons are spacings has been described only with regard to the coarse field pixel A, it will be understood, as previously discussed, that each one of the pixels in the 64×64 coarse radiance field is also paired in the same ordered sequence.

In accordance with this invention, a coarse image can be processed in other ways to derive an improvement function applicable to the full resolution image. For example, a spatial filter algorithm can be involved in the process. After deriving a coarse field representative of an image-wise distribution of radiation from the original scene, a Fourier transform may be performed thereon to derive a coarse two-dimensional Fourier frequency coefficient array or field. By applying a spatial frequency filter to this array and inversely transforming the results, a coarse improvement field may be obtained for application to the full resolution image, as described above.

Still another technique of image processing useful with this invention would apply a color improvement algorithm to the coarse image to derive a coarse field color improvement function which, when expanded, is applied to the full resolution image field. The color improvement algorithm could be one which independently normalizes or rescales the long-, middle-, and short- wavelength records to correct for different spectral distributions of illumination in the original scene.

Figure 7:
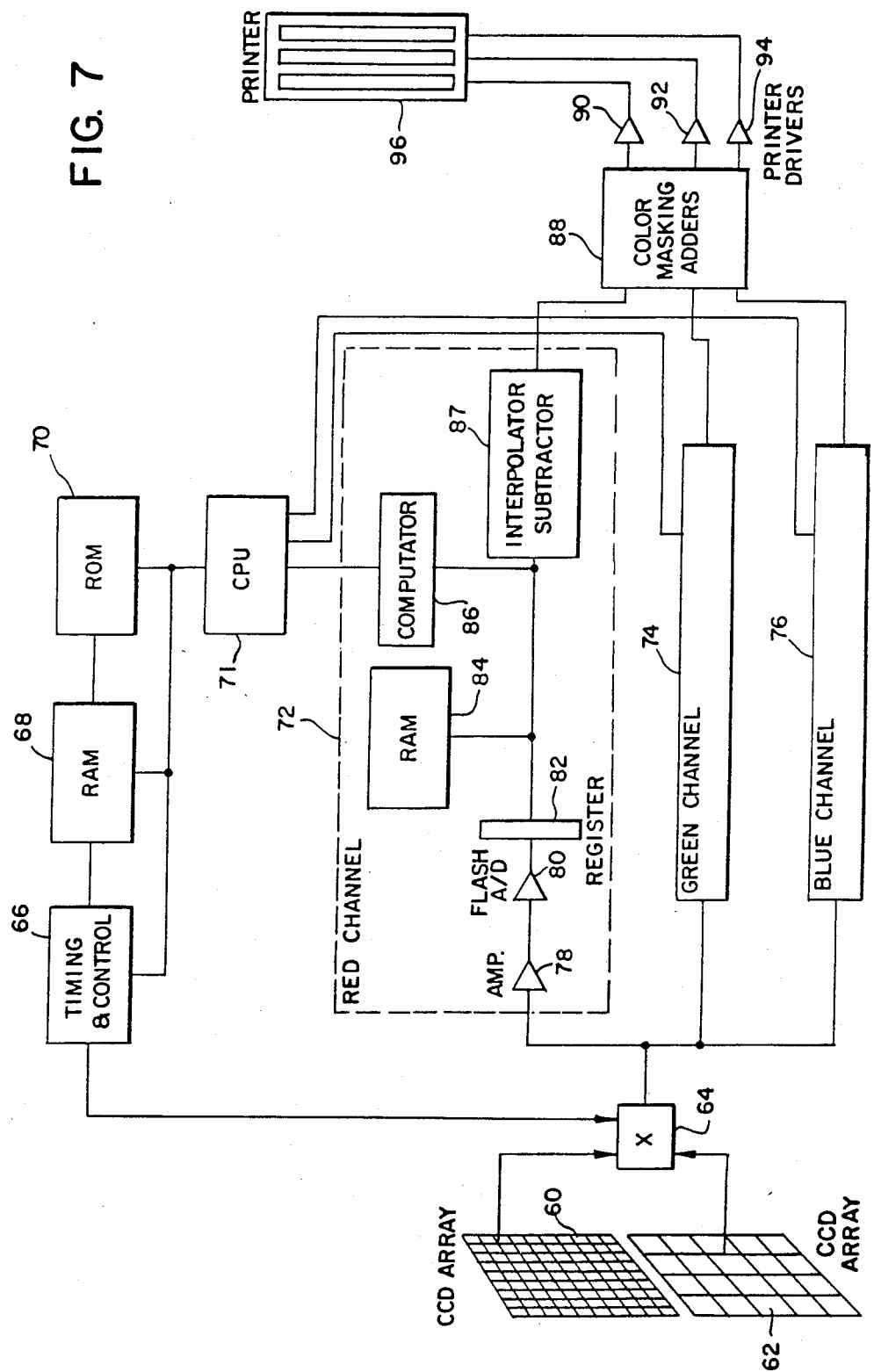
FIG. 7 is a block diagram showing an alternate embodiment of the invention.

Referring now to FIG. 7, there is shown an alternate arrangement for the image processing apparatus of this invention wherein a scene may be directly scanned without first making a slide transparency thereof. The scene is scanned by a high resolution two-dimensional CCD array 60 which may comprise 1,024 by 1,024 photodetecting elements, upon which array is focused an image of the scene. The high resolution CCD array 60 preferably comprises red, green, and blue filter elements arranged in a mosaic pattern. The high resolution CCD array operates in the manner of the line scanner 12 to provide radiance values for each picture element or pixel in the scene for the three primary red, green, and blue colors. Thus, a high resolution radiance field from the scene may be measured directly by the CCD array 60.

A coarse two-dimensional CCD array as shown at 62 can also measure an image focused upon it directly from the scene. This image corresponds to the coarse radiance field previously computed in block V of the flowchart of FIG. 3 and graphically illustrated in FIG. 5. The coarse CCD array 62 also includes red, green and blue filter elements arranged in the manner previously described with regard to the full resolution array 60. Thus, each photodetective element in the coarse CCD array 62 measures coarse radiance value corresponding to the average radiance value for each spatially corresponding 8×8 pixel group in the CCD array 60 for a particular one of the three red, green or blue primary colors. In this manner the average radiance field may be measured directly by the CCD array 62 so as to avoid the computational steps described with regard to blocks II to VI in the flowchart of FIG. 3.

The radiance values sensed by the CCD arrays 60 and 62 are serially gated through a gate 64 to input red, green, and blue color channels 72, 74 and 76 simultaneously. The gate 64, in turn, is controlled through a timing and control circuit 66 which receives programmed instructions from a central processing unit 71. The central processing unit 71, in turn, is controlled through a random access memory (RAM) 68 and a read only memory (ROM) 70 so as to control the gate 64 in a manner that operates sequentially to sense the photodetective elements of the CCD arrays 60 and 62 to provide a stream of sensed analog radiance values to each of the three color channels 72, 74 and 76.

The sensed analog radiance values from the gate 64 are amplified by an amplifier 78 and, in turn, converted to logarithmic equivalents in digital format by a flash analog-to-digital converter 80 for input to a register 82 from which only the logarithmic average radiance values in digital format from the coarse CCD array 62 are transferred for storage in a random access memory 84. Thus, the random access memory (RAM) 84 stores only the logarithmic average radiance values for the coarse average radiance field as sensed by the coarse CCD array 62 while the radiance values for the full resolution radiance field are stored by the CCD array 60.

The central processing unit 71 thereafter operates to control a computator 86 to perform the aforementioned computations with respect to the coarse radiance field. Since the radiance values are converted by the converter 80 to logarithmic equivalents, all previously described multiplications and divisions now are computed as additions and subtractions, respectively. The coarse image radiance field, as previously discussed, is thereafter subtracted from the coarse processed image field and stored in the RAM 84 to provide a coarse improvement factor field in the manner described with regard to the flowchart of FIG. 3. The low resolution improvement field is thereafter expanded by any well-known method of interpolation in the aforementioned manner by the interpolator subtractor circuit 87 to provide an expanded and smoothed improvement factor in the manner described with regard to block II in FIG. 4. The expanded improvement factor is thereafter subtracted from the full resolution radiance field stored in the full resolution CCD array 60 by the interpolator subtractor circuit 87 to provide a full resolution improved final output image.

The three channels 72, 74, and 76 operate simultaneously to provide a full resolution final output image to a color masking adder circuit 88 which operates in the aforementioned manner to provide a color masking operation to provide output values in each of the three primary red, green and blue colors, which make up the output fields respectively. The output values in each of the three primary colors are directed respectively to three input printer drivers 90, 92, and 94 for controlling a conventional printer 96 to print a hard copy of the scene detected by the CCD arrays 60 and 62, such that the image of the scene is improved by efficient image processing. Again, it may be desirable to reproduce the image by subtracting only a selected proportion of the expanded improvement factor field from the sensed high resolution illumination radiance field.

These and other variations and modifications of the invention are within the scope of the invention in its broader aspects.

We claim:

1. An image improvement method comprising the steps of
   determining a radiance field representative of a comparatively fine resolution image-wise distribution of radiation from an original scene, and
   determining an improved image field by modifying said radiance field with an improvement function derived from the processing of a regular array of light values of a comparatively coarse resolution representation of said original scene.

2. The method of claim 1 wherein
said method is repeated for each one of a plurality of ranges of wavelengths of radiation from the original scene to derive final image fields defining an improved multicolor image of said original scene.

3. An image analysis and reconstitution method which comprises
   developing a coarse resolution improvement function from the processing of relatively coarse resolution radiance field representative of an image-wise distribution of radiance from an original scene, and
   modifying a comparatively fine resolution radiance field representative of an image-wise distribution of radiance from said scene with a full resolution improvement function derived by smoothly expanding said coarse resolution improvement function to dimensions equivalent to those of said comparatively fine resolution radiance field.

4. An image improvement method comprising:
   generating a finely divided and a coarsely divided radiance field, each representing an image-wise distribution of radiation within a selected range of wavelengths from an original scene;
   processing said coarsely divided radiance field according to a predetermined analytical program to derive a coarse improvement function field;
   smoothing said coarse improvement function field by interpolation to develop a smooth improvement function field equivalent to the dimensions of said finely divided radiance field; and
   modifying each element of said finely divided radiance field by the corresponding element of said smooth improvement function field to determine an improved finely divided image of said original scene.

5. The method of claim 4 wherein the processing of the coarsely divided radiance field comprises:
   the selected comparison of each element thereof with other elements of said coarsely divided radiance field to obtain a processed coarse image field having new comparative values for each of such elements responsive to the radiance values from substantially al other portions of said coarsely divided radiance field; and
   wherein said coarsely divided radiance field is subtracted from said processed coarse image field to obtain the coarse improvement function field.

6. An image analysis and reconstitution method comprising:
   determining a finely-divided radiance field representative of an image-wise distribution of radiation from an original scene,
   generating a coarse radiance field representative of said original scene containing significantly fewer image elements than those of said finely divided radiance field,
   processing said coarse radiance field according to a defined program to derive a processed coarse field,
   comparing said coarse radiance field with said processed coarse field to determine a coarse improvement function field,
   expanding and interpolating said coarse improvement function field to dimensions equivalent to the number of image elements in said finely divided radiance field to obtain a full resolution improvement function, and
   modifying each of the elements of said finely divided radiance field by the corresponding element of said full resolution improvement function to determine an improved final image field.

7. An image analysis and reconstitution method comprising:
   generating a relatively coarse divided radiance field representative of an image-wise distribution of radiation from an original scene,
   processing said coarsely divided radiance field to determine a coarse improvement function field,
   generating a relatively finely divided radiance field representative of an image-wise distribution of radiation from said scene with substantially higher resolution than that of said coarsely divided radiance field,
   smoothly interpolating said coarse improvement function to derive a finely divided improvement function substantially equivalent to the dimensions of said finely divided radiance field, and
   modifying each element of said finely divided radiance field in accordance with the value of the corresponding element of said finely divided improvement function to obtain a final image field for use in generating an improved image of said original subject.

8. An image analysis and reconstitution method comprising the steps of
   developing a coarse resolution improvement function from the processing of a relatively coarse resolution radiance field representative of an image-wise distribution of radiance from an original scene,
   smoothly expanding said coarse resolution improvement function to a full resolution improvement function defined on dimensions equivalent to those of a comparatively fine resolution radiance field representative of an image-wise distribution of radiance from said scene, and modifying a comparatively fine resolution radiance field with said full resolution improvement function.

9. A method for improving a first radiance field having a radiance value defined at each point of a high resolution representation of a scene, wherein the method comprises the steps of sensing, with a coarse resolution light sensing array, a radiance field representative of the scene so as to develop a coarse resolution radiance field having a single value on each pixel of the array, computing a coarse radiance field improvement function as a single-valued function on each pixel of the array, smoothing said coarse radiance field improvement function to obtain a smoothed improvement function that is smoothly defined on the points of the high resolution representation, and modifying the first radiance field by said smooth improvement function to obtain an improved representation of the scene.

10. The method of claim 9 including the further step of controlling with a computer the distribution of light on a screen for displaying said improved representation of the scene.

* * * * *